(12) United States Patent
Nagasawa

(10) Patent No.: US 9,283,916 B2
(45) Date of Patent: Mar. 15, 2016

(54) OCCUPANT PROTECTION DEVICE

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/457,025

(22) Filed: Aug. 11, 2014

(65) Prior Publication Data

US 2015/0061268 A1    Mar. 5, 2015

(30) Foreign Application Priority Data

Aug. 29, 2013 (JP) ................................. 2013-178267

(51) Int. Cl.
  *B60R 21/231* (2011.01)
  *B60R 21/00* (2006.01)

(52) U.S. Cl.
  CPC ....... *B60R 21/231* (2013.01); *B60R 2021/0051* (2013.01); *B60R 2021/0053* (2013.01); *B60R 2021/0055* (2013.01); *B60R 2021/23107* (2013.01); *B60R 2021/23169* (2013.01)

(58) Field of Classification Search
  CPC .................. B60R 21/231; B60R 2021/23107; B60R 2021/0053; B60R 2021/0051; B60R 2021/23169
  See application file for complete search history.

(56) References Cited

U.S. PATENT DOCUMENTS

| | | | |
|---|---|---|---|
| 2,834,606 A * | 5/1958 | Bertrand ................. | B60R 21/16 206/522 |
| 6,092,836 A | 7/2000 | Saslecov | |
| 6,217,059 B1 * | 4/2001 | Brown .................... | B60R 21/16 280/730.1 |
| 7,090,245 B2 * | 8/2006 | Yoshikawa ............ | B60R 21/206 280/729 |
| 7,669,897 B2 * | 3/2010 | Sano ..................... | B60R 21/045 280/729 |
| 8,376,396 B2 | 2/2013 | Miller et al. | |
| 8,882,138 B1 * | 11/2014 | Hicken ................. | B60R 21/231 280/730.1 |
| 8,894,095 B1 | 11/2014 | Meister et al. | |
| 2002/0149187 A1 | 10/2002 | Holtz et al. | |
| 2003/0141709 A1 | 7/2003 | Honda et al. | |
| 2006/0028004 A1 | 2/2006 | Oota et al. | |
| 2006/0212989 A1 | 9/2006 | White | |
| 2007/0075919 A1 | 4/2007 | Breed | |
| 2007/0296192 A1 | 12/2007 | Sano | |
| 2009/0121462 A1 | 5/2009 | Rick | |
| 2015/0066308 A1 * | 3/2015 | Nagasawa ............. | B60R 21/015 701/45 |

FOREIGN PATENT DOCUMENTS

| | | |
|---|---|---|
| JP | 2005-067273 | 3/2005 |
| JP | 2011-213195 | 10/2011 |

* cited by examiner

*Primary Examiner* — Nicole Verley
(74) *Attorney, Agent, or Firm* — Smith, Gambrell & Russell, LLP

(57) ABSTRACT

An occupant protection device protects an occupant who sits in a seat of a vehicle. The occupant protection device includes a kneecap regulation unit that suppresses a forward movement of the kneecaps of the occupant at the time of a collision of the vehicle.

17 Claims, 7 Drawing Sheets

OCCUPANT PROTECTION DEVICE

CROSS-REFERENCES TO RELATED APPLICATIONS

The present application claims priority from Japanese Patent Application No. 2013-178267 filed on Aug. 29, 2013, the entire contents of which are hereby incorporated by reference.

BACKGROUND

1. Technical Field

The present invention relates to an occupant protection devices that protect an occupant.

2. Related Art

Conventionally, there have been developed devices or systems to make the restraining position of an occupant to be suitable, using a seatbelt or airbag when a vehicle collides with an obstacle or the like. Also, there are occupant protection devices that protect an occupant by restraining the lower legs of the occupant (e.g., see Japanese Unexamined Patent Application Publication (JP-A) Nos. 2005-67273 and 2011-213195).

JP-A No. 2005-67273 discloses an occupant protection device that corrects an occupant's posture according to the state in which the occupant is sitting, so as to restrain the occupant at the time of a collision in a stable manner. This device includes an airbag to be expanded between the legs of the occupant to this end. JP-A No. 2011-213195 discloses an occupant protection device that sufficiently protects an occupant with a small body type at the time of a front end crash of a vehicle. This device includes a knee airbag unit, an airbag unit for a popup seat, and a seatbelt that adjust the restrained posture of the occupant.

However, it is difficult for conventional occupant protection devices to suppress a forward movement of the lower body of the occupant including the knees and lower torso, for various seating positions and various body types. Also, in the case that the knees, the kneecaps in particular, have moved forward, the lower torso may have descended, and the seatbelt restraining position may not be suitable.

SUMMARY OF THE INVENTION

The present invention has been designed in consideration of the circumstances described above, and an object thereof is to provide an occupant protection device capable of restraining an occupant in a suitable position by suppressing the movement of the lower legs of the occupant.

An aspect of the present invention provides an occupant protection device that protects an occupant who sits in a seat. The occupant protection device includes a kneecap regulation unit that suppresses a forward movement of the kneecaps of the occupant at the time of a collision of a vehicle.

The occupant protection device may further include a seatbelt that suppresses a forward movement of the lower torso of the occupant.

The occupant protection device may further include a behind-the-knee regulation unit that presses behind the knees of the occupant.

The occupant protection device may further include a calf regulation unit that presses the calves of the occupant.

The kneecap regulation unit may be a knee airbag.

The kneecap regulation unit may be a knee guard.

The kneecap regulation unit may include a first knee airbag provided to the front of the occupant, a second knee airbag provided to a door trim of the vehicle, and a third knee airbag provided to the center console of the vehicle.

The calf regulation unit may be a calf airbag that presses the calves.

The calf regulation unit may be a calf regulation member provided on the forward side of the seat so as to be moved separately from the seat.

The calf regulation unit may be a calf regulation member provided on the forward side of the seat so as to be moved integral with the seat.

The knee airbag may press from the kneecaps to the shins.

The knee airbag may press from the kneecaps, both sides of the kneecaps and shins, to both sides of the shins.

The knee airbag may be divided into at least two in the vertical direction of the vehicle, and press from the kneecaps to the shins.

The knee airbag may be divided into at least two in the horizontal direction of the vehicle, and press the kneecaps and both sides of the kneecaps.

The calf airbag may be provided to the seat.

The calf airbag may be provided to a cross member.

The calf airbag may press from the calves to both sides of the calves.

The calf airbag may be divided into at least two in the vertical direction of the vehicle, and press from the calves to both sides of the calves.

The calf regulation unit may be a calf airbag that presses the calves, and the lower end of the knee airbag may be equal to or lower than that of the calf airbag in the vertical direction of the vehicle.

DETAILED DESCRIPTION

Hereinafter, implementations of the present invention will be described with reference to the drawings.

Figure 1:
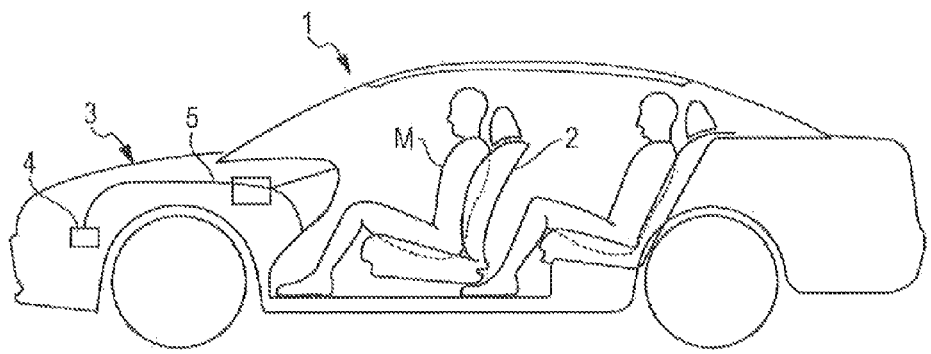
FIG. 1 is a diagram illustrating a vehicle including an occupant protection device according to an implementation of the present invention.
Figure 2:
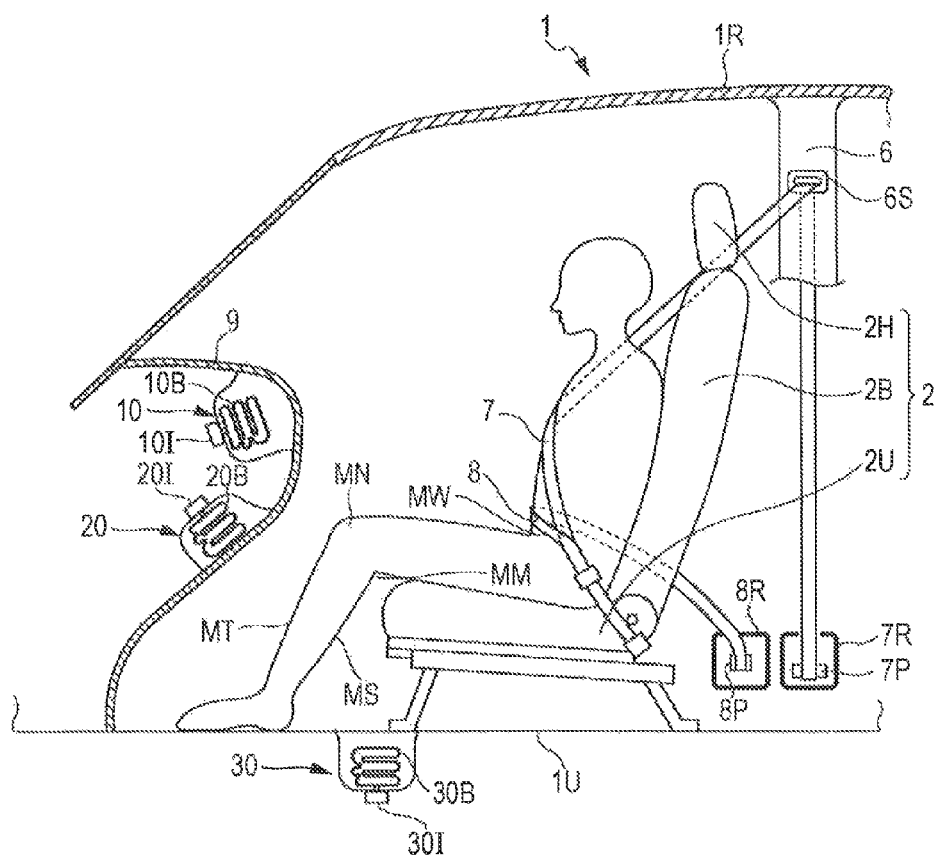
FIG. 2 is a vehicle space side view of the vehicle including an occupant protection device according to the implementation of the present invention.

FIGS. 1 and 2 illustrate an implementation of the present invention. FIG. 1 is a vehicle 1 including an occupant protection device according to the implementation of the present invention. The vehicle 1 including the occupant protection device according to the implementation of the present invention includes at least a seat 2, a front portion 3 serving as the vehicle front portion, a collision detecting sensor 4, and a control unit 5. The seat 2 is provided inside the vehicle space of the vehicle 1, and an occupant M sits in the seat 2. The collision detecting sensor 4 is provided to the front of the front portion 3 of the vehicle 1. The control unit 5 is provided to the backward of the front portion 3 of the vehicle 1, and outputs a signal to a mechanism configured to control the operation of a kneecap regulation unit, a calf regulation unit, and a seatbelt, in response to the signal detected at the collision detecting sensor 4.

FIG. 2 is a vehicle space side view of the vehicle 1 including an occupant protection device according to the implementation of the present invention. The seat 2 is provided inside the vehicle space of the vehicle 1, and the occupant M sits in the seat 2. The seat 2 is made up of a seat cushion 2U made of a square cushion disposed horizontally to the vehicle 1, on which the occupant M sits, a seat back 2B which is provided generally perpendicular to the seat cushion 2U, and provided with a rectangular shape so as to be adjusted by the occupant M, which is positioned at the back of the occupant M, and a head cushion 2H which is the upper portion of the seat back 2B, made of a square cushion, which is positioned at the head of the occupant M. The occupant M sits, lowering his/her hips in the seat cushion 2U of the seat 2 with his/her back to the seat back 2B.

A lateral center pillar 6 of the vehicle 1 is provided to the rear of the seat 2 in the vertical direction from a floor 1U to a roof 1R of the vehicle 1. A slip guide 6S is provided to the upper portion of the center pillar 6, and a shoulder retractor 7R having a shoulder pulley 7P configured to wind a shoulder seatbelt 7 for protecting the chest is provided to the lower portion. The shoulder seatbelt 7 extends upward within the center pillar 6 from the shoulder retractor 7R following the center pillar 6, turns back at the slip guide 6S, and extends downward. Also, one end of a waist seatbelt 8 for protecting the chest is fixed to the rear lower portion of the seat cushion 2U to restrain the waist MW of the occupant M, and the other end thereof is attached to a waist retractor 8R including a waist pulley 8P configured to wind the waist seatbelt 8, via a buckle.

A dash panel 9 extending in the vehicle width direction is provided to the front of the seat 2. There are provided an upper body protection unit made up of an upper body airbag unit 10 configured to press the upper body of the occupant M, and a kneecap regulation unit made up of a knee airbag unit 20 configured to suppress forward movement of the kneecaps of the occupant M. The upper body airbag unit 10 is attached to the upper portion of the dash panel 9 so that an upper body airbag 10B is expanded toward the upper body of the occupant M.

The knee airbag unit 20 is attached to the lower portion of the dash panel 9 so that the knee airbag 20B is expanded toward the lower legs of the occupant M. A behind the-knee regulation unit and a calf regulation unit, which are made up of a rear lower leg airbag unit 30, configured to press behind-the-knees and the calves of the occupant M are provided to the floor 1U of the vehicle space of the vehicle 1 in front of the seat. The rear lower leg airbag unit 30 is attached so that a rear lower leg airbag 30B is expanded from the floor 1U to the upward direction.

Here, the rear lower leg airbag unit 30 serves as the behind-the-knee regulation unit and calf regulation unit, and presses the shins MT of the occupant N, behind the knees MM and calves MS in a manner sandwiching these with the knee airbag 20B. Thus, the vertical movement of the knees, and principally, elevation of the knees is suppressed, and the dropping of the lower torso is suppressed. The rear lower leg airbag unit 30 may be provided to a cross member. In the case that the seat 2 is the driver's seat, the upper body protection unit may be provided to the steering wheel.

The upper body airbag unit 10 is made up of an upper body airbag 10B housed in a folded state, and an upper body inflator 10I configured to supply gas to the upper body airbag 10B in response to the signal from the control unit 5. The control unit 5 transmits the signal to the upper body inflator 10I by cable or by radio which is not illustrated. The upper body inflator 10I supplies gas to the upper body airbag 10B in response the received signal to expand and inflate the upper body airbag 10B.

The knee airbag unit 20 is made up of a knee airbag 20B housed in a folded state, and a knee airbag inflator 20I configured to supply gas to the knee airbag 20B in response to the signal from the control unit 5. The control unit 5 transmits the signal to the knee airbag inflator 20I by cable or by radio which is not illustrated. The knee airbag inflator 20I supplies gas to the knee airbag 20B in response to the received signal to expand and inflate the knee airbag 20B.

The rear lower leg airbag unit 30 is made up of a rear lower leg airbag 30B housed in a folded state, and a rear lower leg airbag inflator 30I configured to supply gas to the rear lower leg airbag 30B in response to the signal from the control unit 5 to expand and inflate the rear lower leg airbag 30B. The control unit 5 transmits the signal to the rear lower leg airbag inflator 30I by cable or by radio which is not illustrated. The rear lower leg airbag inflator 30I supplies gas to the rear lower leg airbag 30B in response to the received signal to expand and inflate the rear lower leg airbag 30B.

The occupant protection device according to the implementation of the present invention includes the kneecap regulation unit configured to suppress at least forward movement of an kneecaps of the occupant, and further may include the seatbelt to suppress forward movement of the lower torso of the occupant, the behind-the-knee regulation unit configured to press behind the knees of the occupant, and the calf regulation unit configured to press calves of the occupant.

Figure 3:
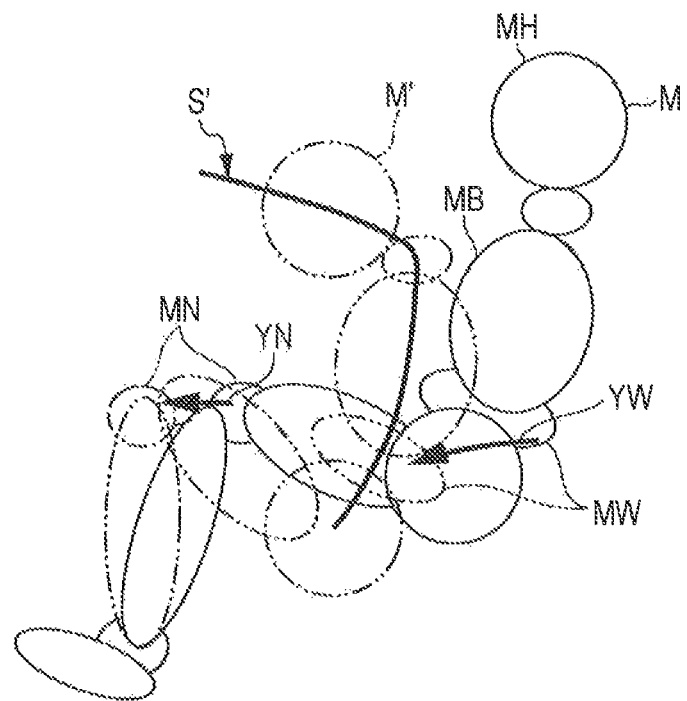
FIG. 3 is a diagram schematically illustrating a restraining position of an occupant using an occupant protection device according to the related art.

Next, the restraining position of an occupant using an occupant protection device according to the related art will be described with reference to FIG. 3. FIG. 3 is a diagram schematically illustrating the restraining position of an occupant using an occupant protection device according to the related art. The occupant M moves forward due to inertia at the time of a forward collision of the vehicle 1. At this time, the kneecaps MN of the occupant M and waist MW also move forward as illustrated by an arrow YN and an arrow YW, and the body of the occupant M descends. Thus, the upper body falls forward as indicated by a line S', and becomes unstable. Thus, the head MH and chest MB of the occupant M move a great distance as illustrated by an occupant M indicated by the line S', and the restraining position becomes unsuitable.

Figure 4:
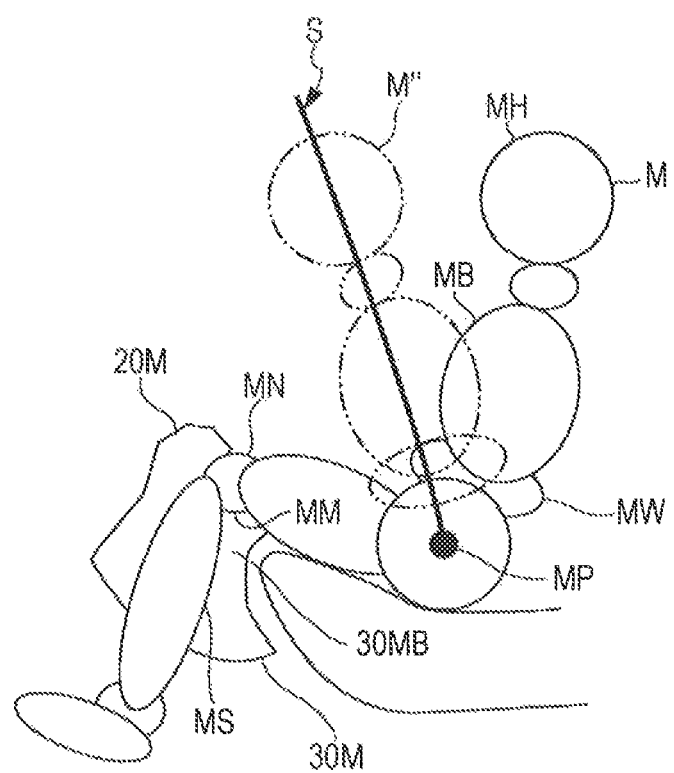
FIG. 4 is a diagram schematically illustrating a restraining position of an occupant using the occupant protection device according to the implementation of the present invention.

The restraining position of the occupant M using the occupant protection device according to the implementation of the present invention will be described with reference to FIG. 4. FIG. 4 is a diagram schematically illustrating the restraining position of the occupant M using the occupant protection device according to the implementation of the present invention. The occupant M attempts to move forward due to inertia at the time of a forward collision of the vehicle 1. At this time, a kneecap regulation unit 20M is activated to suppress forward movement of the kneecaps MN of the occupant M. Thus, the kneecap regulation unit 20M presses the kneecaps MN in a direction countering a vector of the thighs moving forward within the vehicle space. Simultaneously, a behind-the-knee regulation unit 30MB and a calf regulation unit 30M press behind the knees MM and the calves MS of the occupant M. That is to say, the kneecap regulation unit 20M, behind-the-knee regulation unit 30MB, and calf regulation unit 30M sandwich the lower legs of the occupant M from the front and rear, thereby fixing the knee positions. Thus, the movement of the kneecaps MN is suppressed, and the movement of the waist MW of the occupant M pressed by the waist seatbelt 8 is also sufficiently suppressed. Thus, the movement of the lower legs of the occupant M can be suppressed. Accordingly, at the time of a collision, the upper body of an occupant falls forward as illustrated by a line S with a lower point MP of the waist MW as a supporting point, thereby enabling the restraining position of the occupant M to be made suitable.

First Implementation

Figure 5:
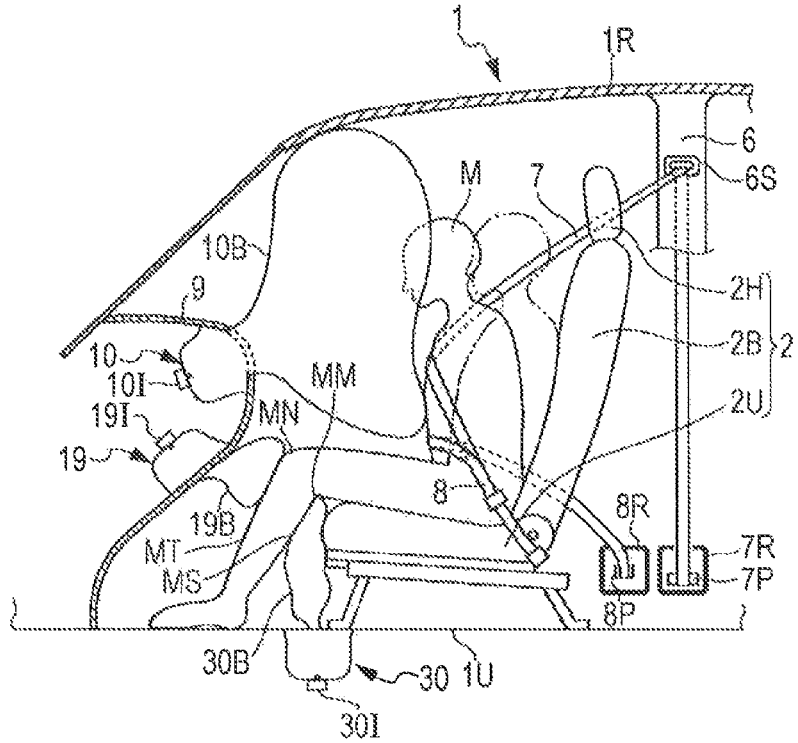
FIG. 5 is a vehicle space side view of a vehicle including an occupant protection device according to a first implementation of the present invention.

FIG. 5 is a vehicle space side view of a vehicle 1 including an occupant protection device according to a first implementation of the present invention. The same reference numerals are employed regarding the same configurations as those in FIG. 2, and description thereof will be omitted accordingly FIG. 5 illustrates a state in which the kneecap regulation unit, behind-the-knee regulation unit, and calf regulation unit are activated by a collision. Specifically, FIG. 5 illustrates a state in which there are expanded the upper body airbag 10B of the upper body airbag unit 10 configured to protect the upper body, the kneecap airbag 19B of the kneecap airbag unit 19 corresponding to the kneecap regulation unit, and the rear lower leg airbag 30B of the rear lower leg airbag unit 30 corresponding to the behind-the-knee regulation unit and calf regulation unit.

The occupant protection device according to the first implementation of the present invention is made up of the kneecap airbag unit 19 serving as the kneecap regulation unit, the rear lower leg airbag unit 30 serving as the behind-the-knee regulation unit and calf regulation unit, and the waist seatbelt 8. The kneecap airbag unit 19 is provided to the lower portion of the dash panel 9 extending in the vehicle width direction in front of the occupant M. The rear lower leg airbag unit 30 is provided to the floor 1U or cross member so that the rear lower leg airbag 30B expands upward from the floor 1U.

The occupant protection device according to the first implementation of the present invention is configured so that the kneecap airbag 19B of the kneecap airbag unit 19 suppresses forward movement of the kneecaps MN of the occupant M at the time of expansion, the kneecap airbag 19B presses the kneecaps MN, and the lower portion of the dash panel 9 withstands force due to inflation at the time of expansion of the kneecap airbag unit 19 and force from the occupant M. The rear lower leg airbag unit 30 inflates and expands the rear lower leg airbag 30B between behind the knees MM and the calves MS of the occupant M, and the seat cushion 2U on which the occupant M sits. Thus, the rear lower leg airbag 30B presses the behind the knees MM and calves MS.

At the time of a collision, the upper body inflator 10I, kneecap airbag inflator 19I, rear lower leg inflator 30I, shoulder retractor 7R, and waist retractor 8R are activated. After activation, the upper body airbag unit 10 expands the upper body airbag 10B, the kneecap airbag unit 19 expands the kneecap airbag 19B, the rear lower leg airbag unit 30 expands the rear lower leg airbag 30B, and the shoulder retractor 7R and waist retractor SR cause the shoulder seatbelt 7 and waist seatbelt 8 to forcibly restrain the occupant M. Thus, the kneecap airbag 19B presses forward movement of the kneecaps MN of the occupant M. Also, the rear lower leg airbag 30B presses behind the knees MM and the calves MS of the occupant M. Further, the waist seatbelt 8 suppresses forward movement of the waist MW of the occupant M. Therefore, in the overall occupant protection device, movement to press the front of the kneecaps of the occupant M can be suppressed, and the movement of the lower legs of the occupant M can be suppressed, so the restraining position of the occupant M can be made suitable. In the present invention, the term "time of a collision" includes the time of pre-crash before the collision.

Second Implementation

Figure 6:
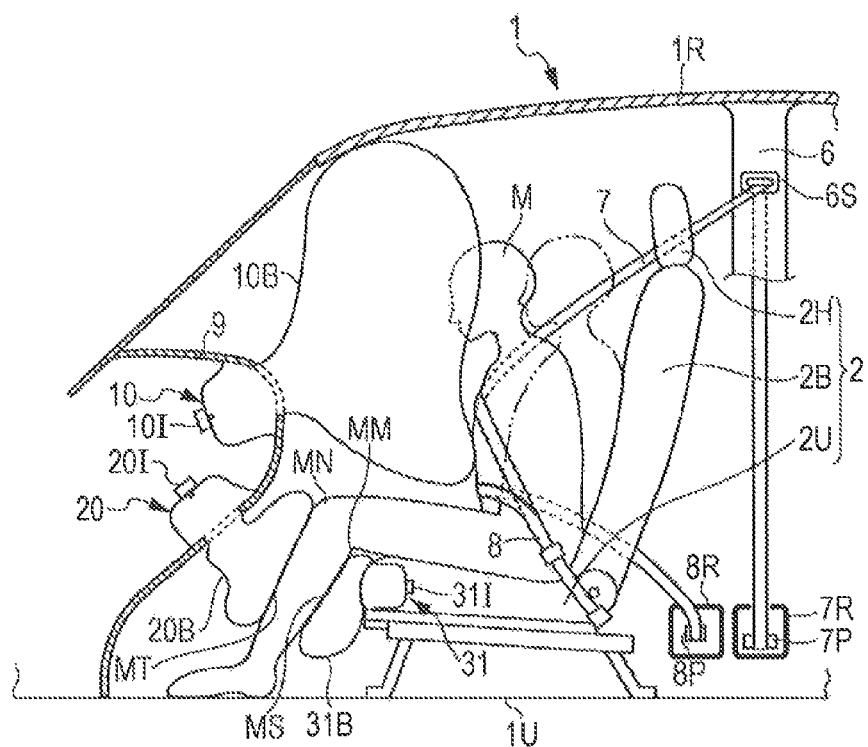
FIG. 6 is a vehicle space side view of a vehicle including an occupant protection device according to a second implementation of the present invention.

FIG. 6 is a vehicle space side view of the vehicle 1 including an occupant protection device according to a second implementation of the present invention. The same reference numerals are employed regarding the same configurations as those in FIG. 2, and description thereof will be omitted accordingly. FIG. 6 illustrates a state in which the kneecap regulation unit, behind-the-knee regulation unit, and calf regulation unit are activated by a collision. Specifically, FIG. 6 illustrates a state in which there are expanded the upper body airbag 10B of the upper body airbag unit 10 configured to protect the upper body, the knee airbag 20B of the knee airbag unit 20 corresponding to the kneecap regulation unit, and a rear lower leg seat airbag 31B of a rear lower leg seat airbag unit 31 corresponding to the behind-the-knee regulation unit and calf regulation unit.

The occupant protection device according to the second implementation of the present invention is made up of the knee airbag unit 20 serving as the kneecap regulation unit, the rear lower leg seat airbag unit 31 serving as the behind-the-knee regulation unit and calf regulation unit, and the waist seatbelt 8. The knee airbag unit 20 is provided to the lower portion of the dash panel 9 extending in the vehicle width direction in front of the occupant M. The rear lower leg seat airbag unit 31 is provided to the front side of the seat cushion 2U so that the rear lower leg seatbelt airbag 31B expands behind the lower legs of the occupant M.

The occupant protection device according to the second implementation of the present invention is configured so that the knee airbag 20B of the knee airbag unit 20 suppresses forward movement of the kneecaps MN of the occupant M at the time of expansion, the knee airbag 20B presses from the kneecaps MN to the shins MT, and the lower portion of the dash panel 9 is configured so as to withstand force due to inflation at the time of expansion of the knee airbag unit 20 and force from the occupant M.

The rear lower leg seat airbag unit 31 inflates and expands the rear lower leg seat airbag 31B between behind the knees MM and the calves MS of the occupant M, and the seat cushion 2U on which the occupant M sits. Thus, the rear lower leg seat airbag 31B presses the behind the knees MM and calves MS.

At the time of a collision, the upper body inflator 10I, knee airbag inflator 20I, rear lower leg seat inflator 31I, shoulder retractor 7R, and waist retractor BR are activated. After activation, the upper body airbag unit 10 expands the upper body airbag 10B, the knee airbag unit 20 expands the knee airbag 20B, the rear lower leg seat airbag unit 31 expands the rear lower leg seat airbag 31B, and the shoulder retractor 7R and waist retractor 8R cause the shoulder seatbelt 7 and waist seatbelt 8, to forcibly restrain the occupant M.

Thus, the knee airbag 20B presses forward movement of the kneecaps MN of the occupant M. Also, the rear lower leg seat airbag 31B presses behind the knees MM and the calves MS of the occupant. Further, the waist seatbelt 8 suppresses forward movement of the waist MW of the occupant M. Therefore, in the overall occupant protection device, suppressing the movement of the lower legs of the occupant N enables the restraining position of the occupant M to be made suitable. Also, providing the rear lower leg seat airbag unit 31 to the seat cushion 2U enables behind the knees MM and the calves MS of the occupant N to be pressed more rapidly.

Third Implementation

Figure 7:
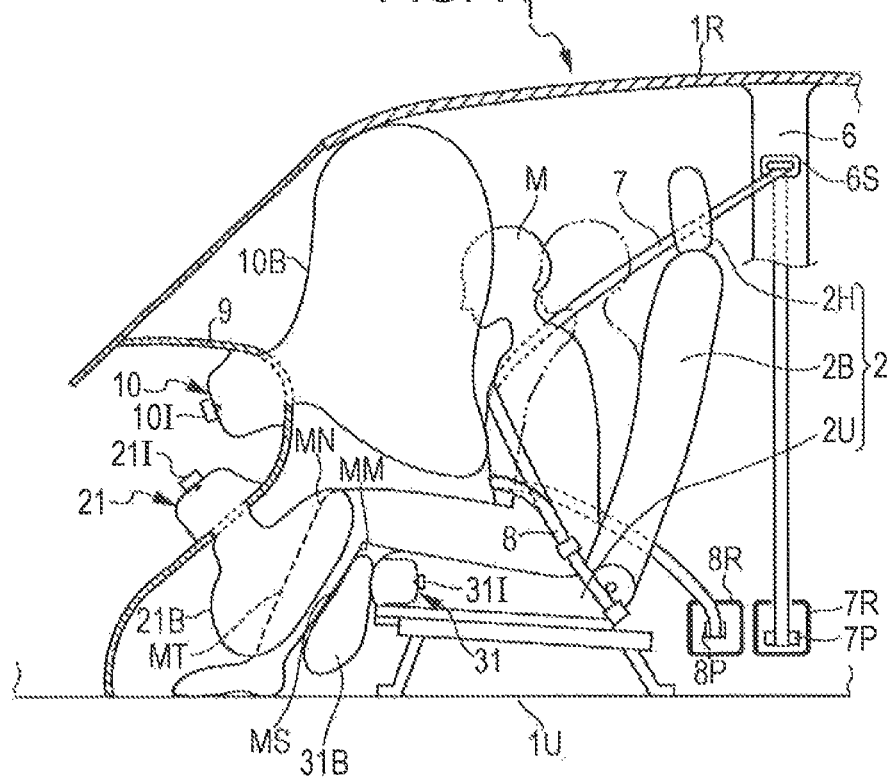
FIG. 7 is a vehicle space side view of a vehicle including an occupant protection device according to a third implementation of the present invention.

FIG. 7 is a vehicle space side view of the vehicle 1 including an occupant protection device according to a third implementation of the present invention. The same reference numerals are employed regarding the same configurations as those in FIG. 2, and description thereof will be omitted accordingly. FIG. 7 illustrates a state in which the kneecap regulation unit, behind-the-knee regulation unit, and calf regulation unit are activated by a collision. Specifically, FIG. 7 illustrates a state in which there are expanded the upper body airbag 10B of the upper body airbag unit 10 configured to protect the upper body, a knee front airbag 21B of a knee front airbag unit 21 corresponding to the kneecap regulation unit, and a rear lower leg seat airbag 31B of a rear lower leg seat airbag unit 31 corresponding to the behind-the-knee regulation unit and calf regulation unit.

The occupant protection device according to the third implementation of the present invention is made up of the knee front airbag unit 21 serving as the kneecap regulation unit, the rear lower leg seat airbag unit 31 serving as the behind-the-knee regulation unit and calf regulation unit, and the waist seatbelt 8. The knee front airbag unit 21 is provided to the lower portion of the dash panel 9 extending in the vehicle width direction in front of the occupant M. The rear lower leg seat airbag unit 31 is provided to the front side of the seat cushion 2U so that the rear lower leg seatbelt airbag 31B expands behind the lower legs of the occupant N.

The occupant protection device according to the third implementation of the present invention is configured so that the knee front airbag 21B of the knee front airbag unit 21 suppresses forward movement of the kneecaps MN of the occupant M at the time of expansion. Further, the knee front airbag 21B is expanded and inflated so as to press from the kneecaps MN to the front of the shins MT, that is, from the kneecaps MN to both sides of the kneecaps MN, and the shins MT and both sides of the shins MT. The lower portion of the dash panel 9 is configured so as to withstand force due to inflation at the time of expansion of the knee front airbag unit 21 and force from the occupant M.

The rear lower leg seat airbag unit 31 inflates and expands the rear lower leg seat airbag 31B between behind the knees MM and the calves MS of the occupant M, and the seat cushion 2U on which the occupant. M sits. Thus, the rear lower leg seat airbag 31B presses the behind the knees MM and calves MS.

At the time of a collision, the upper body inflator 10I, knee front airbag inflator 21I, rear lower leg seat inflator 31I, shoulder retractor 7R, and waist retractor 8R are activated. After activation, the upper body airbag unit 10 expands the upper body airbag 10B, the knee front airbag unit 21 expands the knee front airbag 21B, the rear lower leg seat airbag unit 31 expands the rear lower leg seat airbag 31B, and the shoulder retractor 7R and waist retractor 8R cause the shoulder seatbelt 7 and waist seatbelt 8 to forcibly restrain the occupant M. Thus, the knee front airbag 21B presses from the kneecaps MN of the occupant M to the front of the shins MT, that is, from the kneecaps MN to both sides of the kneecaps MN, and the shins MT and both sides of the shins MT, thereby suppressing forward movement of the kneecaps MN and forward movement of the shins MT. Also, the rear lower leg seat airbag 31B presses behind the knees MM and the calves MS of the occupant M. Further, the waist seatbelt 8 suppresses forward movement of the waist MW of the occupant M. Therefore, in the overall occupant protection device, particularly pressing the front of the shins MT of the occupant M so as to cover the entire front of the shins MT, and suppressing movement of the lower legs of the occupant M in a stable manner enables the restraining position of the occupant M to be made suitable, In addition to around the kneecaps MN, the shins MT to the calves MS are restrained. Thus, restraining in which the kneecaps MN are not moved by a collision, and simultaneously restraining of the waist MW, enables the upper body's behavior to be restricted in a stable manner even with various seating positions, and different body types.

Fourth Implementation

Figure 8:
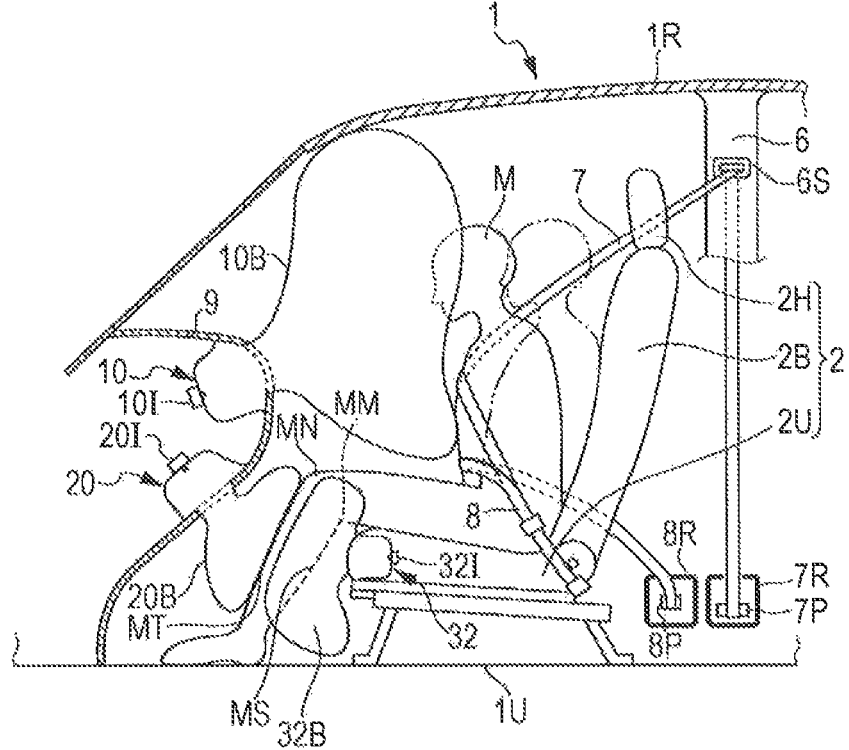
FIG. 8 is a vehicle space side view of a vehicle including an occupant protection device according to a fourth implementation of the present invention.

FIG. 8 is a vehicle space side view of the vehicle 1 including an occupant protection device according to a fourth implementation of the present invention. The same reference numerals are employed regarding the same configurations as those in FIG. 2, and description thereof will, be omitted accordingly. FIG. 8 illustrates a state in which the kneecap regulation unit, behind-the-knee regulation unit, and calf regulation unit are activated by a collision. Specifically, FIG. 8 illustrates a state in which there are expanded the upper body airbag 10B of the upper body airbag unit 10 configured to protect the upper body, the knee airbag 20B of the knee airbag unit 20 corresponding to the kneecap regulation unit, and a rear lower leg rear airbag 32B of a rear lower leg rear airbag unit 32 corresponding to the behind-the-knee regulation unit and calf regulation unit.

The occupant protection device according to the fourth implementation of the present invention is made up of the knee airbag unit 20 serving as the kneecap regulation unit, the rear lower leg rear airbag unit 32 serving as the behind-the-knee regulation unit and calf regulation unit, and the waist seatbelt 8. The knee airbag unit 20 is provided to the lower portion of the dash panel 9 extending in the vehicle width direction in front of the occupant M. The rear lower leg rear airbag unit 32 is provided to the front side of the seat cushion 2U so that the rear lower leg rear airbag 32B expands behind the lower legs of the occupant M.

The occupant protection device according to the fourth implementation of the present invention is configured so that the knee airbag 20B of the knee airbag unit 20 suppresses forward movement of the kneecaps MN of the occupant M at the time of expansion. The knee airbag 20B presses from the kneecaps MN to the shins MT. The lower portion of the dash panel 9 is configured so as to withstand force due to inflation at the time of expansion of the knee airbag unit 20 and force from the occupant M.

The rear lower leg rear airbag 32B is inflated and expanded so as to press the rear faces of the calves MS, that is, from the calves MS to both sides of the shins MS. The rear lower leg rear airbag unit 32 inflates and expands the rear lower leg rear airbag 32B between behind the knees MM and the calves MS of the occupant M, and the seat cushion 2U on which the occupant M sits. Thus, the rear lower leg rear airbag 32B presses the behind the knees MM and calves MS.

At the time of a collision, the upper body inflator 10I, knee airbag inflator 20I, rear lower leg rear inflator 32I, shoulder retractor 7R, and waist retractor SR are activated. After activation, the upper body airbag unit 10 expands the upper body airbag 10B, the knee airbag unit 20 expands the knee airbag 20B, the rear lower leg rear airbag unit 32 expands the rear lower leg rear airbag 32B, and the shoulder retractor 7R and waist retractor 8R cause the shoulder seatbelt 7 and waist seatbelt 8 to forcibly restrain the occupant M. Thus, the knee airbag 20B suppresses forward movement of the kneecaps MN of the occupant M. Also, the rear lower leg rear airbag 32B presses from the rear faces of the calves MS of the occupant M, that is, from the calves MS to both sides of the calves MS. Further, the waist seatbelt 8 suppresses forward movement of the waist MW of the occupant M. Therefore, in the overall occupant protection device, particularly pressing the rear faces of the calves MS of the occupant M so as to cover all of the rear faces of the calves MS, and suppressing movement of the lower legs of the occupant M, enables the restraining position of the occupant M to be suitable. Providing the rear lower leg rear airbag unit 32 to the seat cushion 2U enables behind the knees MM and the calves MS of the occupant M to be pressed more speedily. Also, around the behind-the-knees is restrained so as to handle a case where the lower legs are separated from the seat 2 by inertia force during a collision. Thus, restraining in which the kneecaps MN are not moved by a collision, and simultaneously restraining of the waist MW, enables the upper body's behavior to be restricted in a stable manner even with various seating positions, and different body types.

Fifth Implementation

Figure 9:
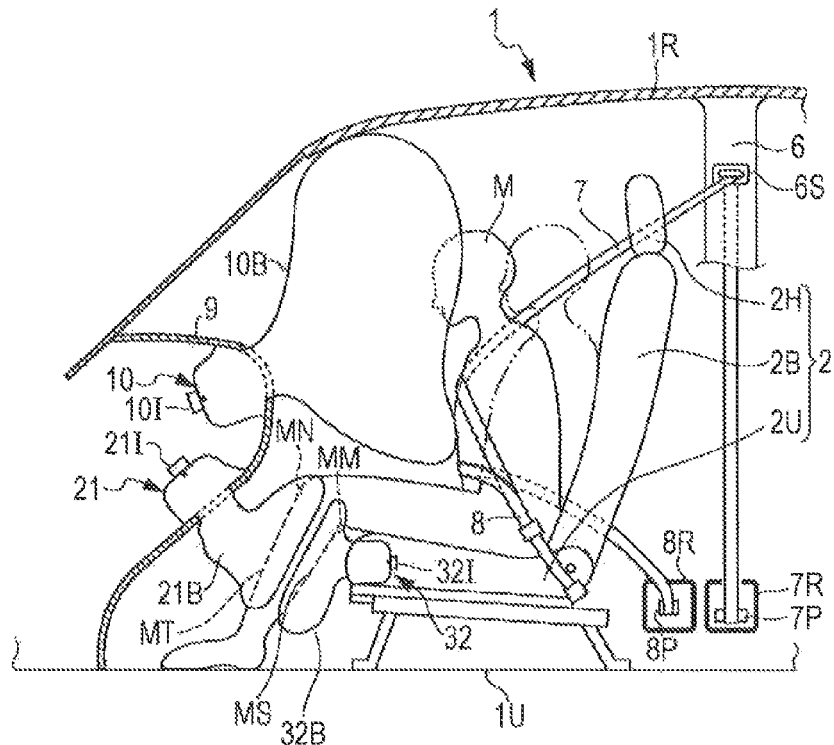
FIG. 9 is a vehicle space side view of a vehicle including an occupant protection device according to a fifth implementation of the present invention.

FIG. 9 is a vehicle space side view of the vehicle 1 including an occupant protection device according to a fifth implementation of the present invention. The same reference numerals are employed regarding the same configurations as those in FIG. 2, and description thereof will be omitted accordingly. FIG. 9 illustrates a state in which the kneecap regulation unit, behind-the-knee regulation unit, and calf regulation unit are activated by a collision. Specifically, FIG. 9 illustrates a state in which there are expanded the upper body airbag 10B of the upper body airbag unit 10 configured to protect the upper body, the knee front airbag 21B of the knee front airbag unit 21 corresponding to the kneecap regulation unit, and the rear lower leg rear airbag 32B of the rear lower leg rear airbag unit 32 corresponding to the behind-the-knee regulation unit and calf regulation unit.

The occupant protection device according to the fifth implementation of the present invention is made up of the knee front airbag unit 21 serving as the kneecap regulation unit, the rear lower leg rear airbag unit 32 serving as the behind-the-knee regulation unit and calf regulation unit, and the waist seatbelt 8. The knee front airbag unit 21 is provided to the lower portion of the dash panel 9 extending in the vehicle width direction in front of the occupant M. The rear lower leg rear airbag unit 32 is provided to the front side of the seat cushion 2U so that the rear lower leg rear airbag 32B expands behind the lower legs of the occupant M.

The occupant protection device according to the fifth implementation of the present invention is configured so that the knee front airbag 21B of the knee front airbag unit 21 suppresses forward movement of the kneecaps MN of the occupant M at the time of expansion. Further, the knee front airbag 21B is expanded and inflated so as to press from the kneecaps MN to the front of the shins MT, that is, from the kneecaps MN to both sides of the kneecaps MN, and the shins MT and both sides of the shins MT. The lower portion of the dash panel 9 is configured so as to withstand force due to inflation at the time of expansion of the knee front airbag unit 21 and force from the occupant M.

The rear lower leg rear airbag 32B is inflated and expanded so as to press the rear faces of the calves MS, that is, from the calves MS to both sides of the shins MS. The rear lower leg rear airbag unit 32 inflates and expands the rear lower leg rear airbag 32B between behind the knees MM and the calves MS of the occupant M, and the seat cushion 2U on which the occupant M sits. Thus, the rear lower leg rear airbag 32B presses behind the knees MM and the calves MS.

At the time of a collision, the upper body inflator 10I, knee front airbag inflator 21I, rear lower leg rear inflator 32I, shoulder retractor 7R, and waist retractor 8R are activated. After activation, the upper body airbag unit 10 expands the upper body airbag 10B, the knee front airbag unit 21 expands the knee front airbag 21B, the rear lower leg rear airbag unit 32 expands the rear lower leg rear airbag 32B, and the shoulder retractor 7R and waist retractor 8R cause the shoulder seatbelt 7 and waist seatbelt 8 to forcibly restrain the occupant M. Thus, the knee front airbag 21B presses from the kneecaps MN of the occupant M to the front of the shins MT, that is, from the kneecaps MN to both sides of the kneecaps MN, and the shins MT and both sides of the shins MT, thereby suppressing forward movement of the kneecaps MN and forward movement of the shins MT. Also, the rear lower leg rear airbag 32B presses behind the knees MM of the occupant M, and the rear faces of the calves MS, that is, from the calves MS to both sides of the calves MS. Further, the waist seatbelt 8 suppresses forward movement of the waist MW of the occupant M. Therefore, in the overall occupant protection device, the front of the shins MT and calves MS of the occupant M are pressed so as to cover the entire front of the shins MT of the occupant M, and all of the rear faces of the calves MS to suppress movement of the lower legs of the occupant M, thereby enabling the restraining position of the occupant M to be made suitable. Providing the rear lower leg rear airbag unit 32 to the seat cushion 2U enables behind the knees MM and calves MS of the occupant M to be pressed more rapidly. Also, the around behind the knees is restrained so as to handle a case where the lower legs are separated from the seat 2 by inertia force during a collision. Thus, restraining in which the kneecaps MN are not moved by a collision, and simultaneously restraining of the waist MW, enables the upper body's behavior to be reproduced in a stable manner even with various seating positions, and different body types.

Sixth Implementation

Figure 10:
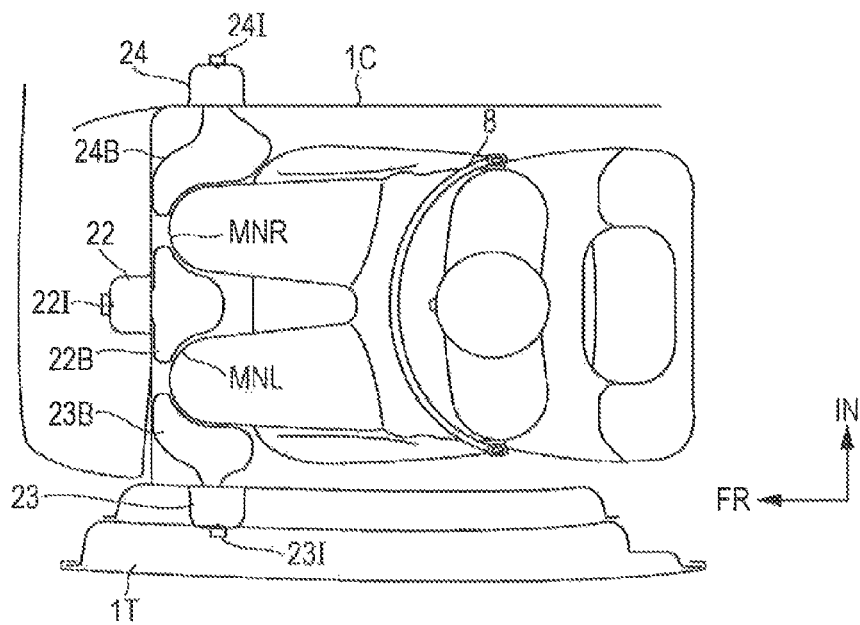
FIG. 10 is a vehicle space top view of a vehicle including an occupant protection device according to a sixth implementation of the present invention.

FIG. 10 is a vehicle space top view of the vehicle 1 including an occupant protection device according to a sixth implementation of the present invention. The same reference numerals are employed regarding the same configurations as those in FIG. 2, and description thereof will be omitted accordingly. FIG. 10 illustrates a state in which the kneecap regulation unit is activated by a collision. Specifically, FIG. 9 illustrates a state in which there are expanded a first knee airbag 22B of a first knee airbag unit 22 in front of the occupant corresponding to the kneecap regulation unit, a second knee airbag 23B of a second knee airbag unit 23 provided to door trim IT of the vehicle 1, and a third knee airbag 24B of a third knee airbag unit 24 provided to the center console 1C of the vehicle 1.

The occupant protection device according to the sixth implementation of the present invention is made up of the first knee airbag unit 22 serving as the kneecap regulation unit, second knee airbag unit 23, third knee airbag unit 24, and waist seatbelt 8. The first knee airbag unit 22 is provided to the lower portion of the dash panel 9 extending in the vehicle width direction in front of the occupant M. As described above, according to the multi-airbag configuration, the occupant can be restrained by enveloping the knees in a curved shape.

The occupant protection device according to the sixth implementation of the present invention is configured so that the first knee airbag 22B of the first knee airbag unit 22 presses the right kneecap MNR and left kneecap MNL of the occupant M from the inner side at the time of expansion, and simultaneously presses the right, kneecap MNR and left kneecap MNL from the front side. The second knee airbag 23B of the second knee airbag unit 23 presses the left kneecap MNL from the outer side from the left side of the occupant M. The third knee airbag 24E of the third knee airbag unit 24 presses the right kneecap MNR from the outer side from the right side of the occupant M. The lower portion of the dash panel 9 is configured so as to withstand force due to inflation at the time of expansion of the first knee airbag unit 22, second knee airbag unit 23, and third knee airbag unit 24, and force from the occupant M.

At the time of a collision, a first knee airbag inflator 22I, a second knee airbag inflator 23I, a third knee airbag inflator 24I, shoulder retractor 7R, and waist retractor 8R are activated. After activation, the first knee airbag unit 22 expands the first knee airbag 22B, the second knee airbag unit 23 expands the second knee airbag 23B, the third knee airbag unit 24 expands the third knee airbag 24B, and the shoulder retractor 7R and waist retractor 8R cause the shoulder seatbelt 7 and waist seatbelt 8 to forcibly restrain the occupant M, which suppresses forward movement of the kneecaps MN of the occupant M. Further, the waist seatbelt 8 suppresses forward movement of the waist MW of the occupant M. Therefore, in the overall occupant protection device, the occupant M is pressed so as to envelop the knees in a curved shape by the multiple airbags, to suppress forward movement of the lower legs of the occupant M, thereby enabling the kneecaps of the occupant M to be sufficiently pressed, and enabling the restraining position to be made suitable. Also, since the airbags are provided in a divided manner, the bag capacity per airbag is smaller, the airbags can rapidly be expanded, and movement of the occupant can be restrained more rapidly. The inward sides and outward sides of the kneecaps MN are restrained, which enables occurrence of horizontal movement of the knees to be suppressed at the joint of the lower torso. Also, movement to the forward direction of the waist MW can be prevented, and the waist MW can be understood to be the point which supports the upper body's behavior in a stable manner. Since the kneecaps MN are not hidden under the dash panel 9, the moment of the lower legs due to load input from the soles of the occupant M can be reduced.

Seventh Implementation

Figure 11:
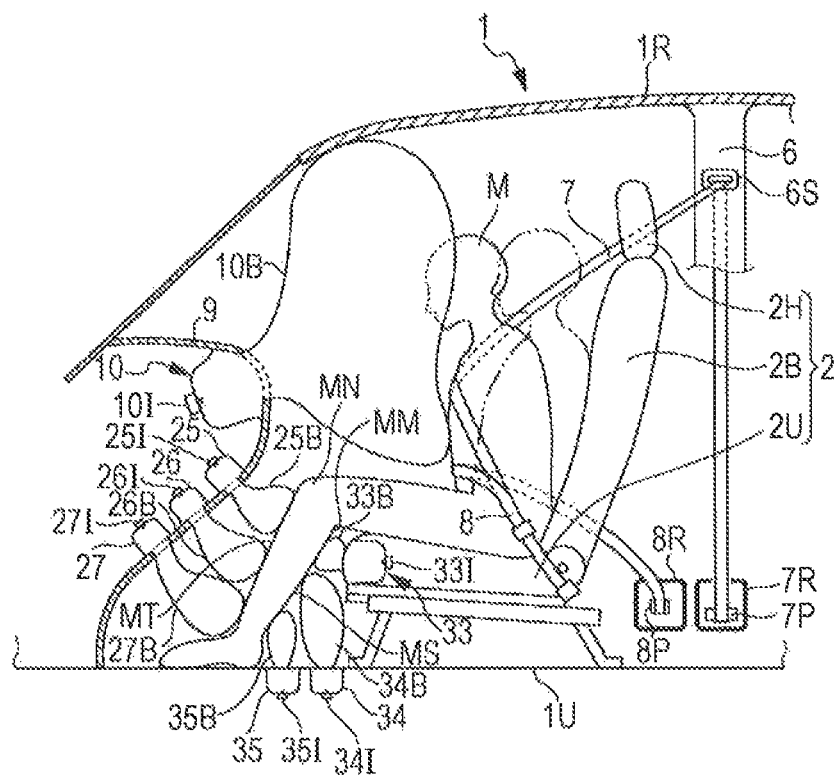
FIG. 11 is a vehicle space top view of a vehicle including an occupant protection device according to a seventh implementation of the present invention.

FIG. 11 is a vehicle space side view of the vehicle 1 including an occupant protection device according to a seventh implementation of the present invention. The same reference numerals are employed regarding the same configurations as those in FIG. 2, and description thereof will be omitted accordingly. FIG. 11 illustrates a state in which the kneecap regulation unit, behind-the-knee regulation unit, and calf regulation unit, are activated by a collision. Specifically. FIG. 11 illustrates a state in which there are expanded the upper body airbag 10B of the upper body airbag unit 10 configured to protect the upper body, an upper knee airbag 25B of an upper knee airbag unit 25, a middle knee airbag 26B of a middle knee airbag unit 26, and a lower knee airbag 27B of a lower knee airbag unit 27, which correspond to the kneecap regulation unit, a rear lower leg upper airbag 33B of a rear lower leg upper airbag unit 33, a rear lower leg middle airbag 34B of a rear lower leg middle airbag unit 34, and a rear lower leg lower airbag 35B of a rear lower leg lower airbag unit 35, which correspond to the behind-the-knee regulation unit and calf regulation unit.

The occupant protection device according to the seventh implementation of the present invention is made up of the upper knee airbag unit 25, middle knee airbag unit 26, and lower knee airbag unit 27, which serve as the kneecap regulation unit, the rear lower leg upper airbag unit 33, rear lower leg middle airbag unit 34, and rear lower leg lower airbag unit 35, which serve as the behind-the-knee regulation unit and calf regulation unit, and the waist seatbelt 8. The upper knee airbag unit 25, middle knee airbag unit 26, and lower knee airbag unit 27 are provided to the lower portion of the dash panel 9 extending in the vehicle width direction in front of the occupant M.

The occupant protection device according to the seventh implementation of the present invention is configured so that the upper knee airbag 25B of the upper knee airbag unit 25 suppresses forward movement of the kneecaps MN of the occupant M at the time of expansion. Further, the middle knee airbag 26B and lower knee airbag 27B are expanded and inflated so as to press from the kneecaps MN to the shins MT, The lower portion of the dash panel 9 is configured so as to withstand force due to inflation at the time of expansion of the upper knee airbag unit 25, middle knee airbag unit 26, and lower knee airbag unit 27, and force from the occupant M.

The rear lower leg upper airbag unit 33 provided to the rear of the lower legs of the occupant M which is positioned on the forward side of the seat cushion 2U, expands the rear lower leg upper airbag 33B to press behind the knees MM. The rear lower leg middle airbag 34B and rear lower leg lower airbag 35B are expanded and inflated so as to press the calves MS. The rear lower leg upper airbag unit 33, rear lower leg middle airbag unit 34, and rear lower leg lower airbag unit 35 inflate and expand the rear lower leg upper airbag 33B, rear lower leg middle airbag 34B, and rear lower leg lower airbag 35B between behind the knees MM and the calves MS of the occupant M, and the seat cushion 2U on which the occupant M sits at the time of expansion, respectively. Thus, behind the knees MM and the calves MS of the occupant M are pressed.

At the time of a collision, the upper body inflator 10I an upper knee airbag inflator 25I, a middle knee airbag inflator 26I, an upper knee airbag inflator 27I, a rear lower leg upper inflator 33I, a rear lower leg middle inflator 34I, a rear lower leg lower inflator 35I, the shoulder retractor 7R, and waist retractor 8R are activated. After activation, the upper body airbag unit 10 expands the upper body airbag 10B, the upper knee airbag unit 25 expands the upper knee airbag 25B, the middle knee airbag unit 26 expands the middle knee airbag 26B, the lower knee airbag unit 27 expands the lower knee airbag 27B, the rear lower leg upper airbag unit 33 expands the rear lower leg upper airbag 33B, the rear lower leg middle airbag unit 34 expands the rear lower leg middle airbag 34B, the rear lower leg lower airbag unit 35 expands the rear lower leg lower airbag 35B, and the shoulder retractor 7R and waist retractor 8R cause the shoulder seatbelt 7 and waist seatbelt 8 to forcibly restrain the occupant M.

Thus, the upper knee airbag 25B, middle knee airbag 26B, and lower knee airbag 27B suppress forward movement of the kneecaps MN of the occupant M, and forward movement of the shins MT. Also, the rear lower leg upper airbag 33B, rear lower leg middle airbag 34B, and rear lower leg lower airbag 35B press behind the knees MM and calves MS of the occupant M. Further, the waist seatbelt 8 suppresses forward movement of the waist MW of the occupant M. Therefore, in the overall occupant protection device, the movement of the lower legs of the occupant M is suppressed, thereby enabling the restraining position of the occupant M to be made suitable. As described above, the knee airbags are divided to at least two in the vertical direction of the vehicle, which press from the kneecaps to the shins. Also, the calf airbags are divided to at least two in the vertical direction of the vehicle, which press from the calves to both sides of the calves. Since the knee airbags and rear lower leg airbags are provided in a divided manner in the occupant protection device according to the seventh implementation, the bag capacity per airbag is reduced, the airbags can rapidly expanded, and movement of the occupant can be restrained more rapidly.

Eighth Implementation

Figure 12:
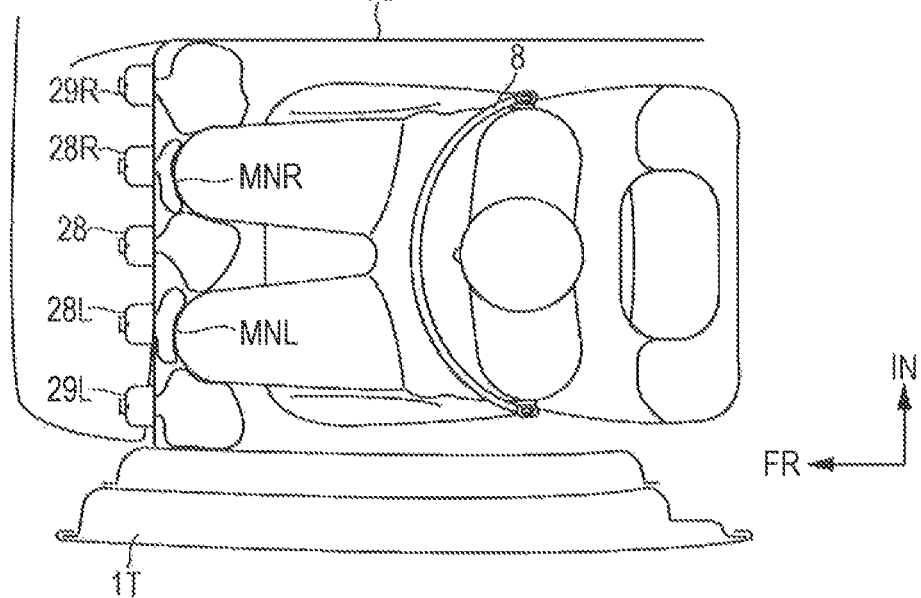
FIG. 12 is a vehicle space side view of a vehicle including an occupant protection device according to an eighth implementation of the present invention.

FIG. 12 is a vehicle space top view of the vehicle 1 including an occupant protection device according to an eighth implementation of the present invention. The same reference numerals are employed regarding the same configurations as those in FIG. 2, and description thereof will be omitted accordingly. FIG. 12 illustrates a state in which the kneecap regulation unit is activated by a collision. Specifically, FIG. 12 illustrates a state in which there are expanded an inter-knee airbag 28B of an inter-knee airbag unit 28 of the center in front of the occupant corresponding to the kneecap regulation unit, a right knee airbag 28RB of a right knee airbag unit 28R corresponding to the position of the right-side kneecap MNR, a left knee airbag 28LB of a left knee airbag unit 28L, corresponding to the position of the left-side kneecap MNL, a right-side knee airbag 29RB of a right-side knee airbag unit 29R configured to press the kneecap MNR from the right side, and a left-side knee airbag 29LB of a left-side knee airbag unit 29L, corresponding to the position of the kneecap MNL from the left side.

The occupant protection device according to the eighth implementation of the present invention is made up of the inter-knee airbag unit 28 serving as the kneecap regulation unit, the right knee airbag unit 28R, left knee airbag unit 28L, right-side knee airbag unit 29R, left-side knee airbag unit 29L, and waist seatbelt 8.

The inter-knee airbag unit 28, right knee airbag unit 28R, left knee airbag unit 28L, right-side knee airbag unit 29R, and left-side knee airbag unit 29L are provided to the lower portion of the dash panel 9 extending in the vehicle width direction in front of the occupant M. The lower portion of the dash panel 9 is configured so as to withstand force due to inflation at the time of expansion of the inter-knee airbag unit 28, right knee airbag unit. 28R, left knee airbag unit 28L, right-side knee airbag unit 29R, and left-side knee airbag unit 29L, and force from the occupant M.

The occupant protection device according to the eighth implementation of the present invention is configured so that the inter-knee airbag 28B of the inter-knee airbag unit 28 presses the right kneecap MNR of the occupant M and left kneecap MNL from the inner side at the time of expansion. The right knee airbag 28RB of the right knee airbag unit 28R presses the right kneecap MNR from the front. The left knee airbag 28LE of the left knee airbag unit 28L presses the left kneecap MNL from the front. The right-side knee airbag unit 29RB of the right-side knee airbag unit 29R presses the right kneecap MNR from the outer side from the right side of the occupant M, The left-side knee airbag unit 29LB of the left-side knee airbag unit 29L presses the left kneecap MNL from the outer side from the left side of the occupant M.

At the time of a collision, an inter-knee inflator 28I, a right knee inflator 28RI, a left knee inflator 28LI, a right-side inflator 29RI, a left-side inflator 29LI the shoulder retractor 7R, and waist retractor 8R are activated, After activation, the inter-knee airbag unit 28 expands the inter-knee airbag 28B, the right knee airbag unit 28R expands the right knee airbag 28RB, the left knee airbag unit 28L, expands the left knee airbag 28LB, the right-side knee airbag unit 29R expands the right-side knee airbag 29RB, the left-side knee airbag unit 29L expands the left-side knee airbag 29LB, and the shoulder retractor 7R and waist retractor 8R cause the shoulder seatbelt 7 and waist seatbelt 8 to forcibly restrain the occupant N, which suppresses forward movement of the kneecaps MN of the occupant M. Further, the waist seatbelt 8 suppresses forward movement of the waist MW of the occupant M. Therefore, in the overall occupant protection device, the knees are pressed by the multiple airbags so as to envelop the knees to suppress forward movement of the lower legs of the occupant M, thereby enabling the restraining position of the occupant M to be made suitable. As described above, since the knee airbag serving as the kneecap regulation unit is divided into at least two in the horizontal direction of the vehicle, which press the kneecaps and both sides of the kneecaps, the bag capacity per airbag is smaller, the airbags can rapidly be expanded, and the movement of the occupant M can be restrained more rapidly. The inward sides and outward sides of the kneecaps MN are restrained, which enables occurrence of horizontal movement of the knees to be suppressed at the joint of the waist MW. Also, movement, to the forward direction of the waist. MW can be prevented, and the lower torso can be understood to be the point which supports the upper body's behavior in a stable manner.

Ninth Implementation

Figure 13:
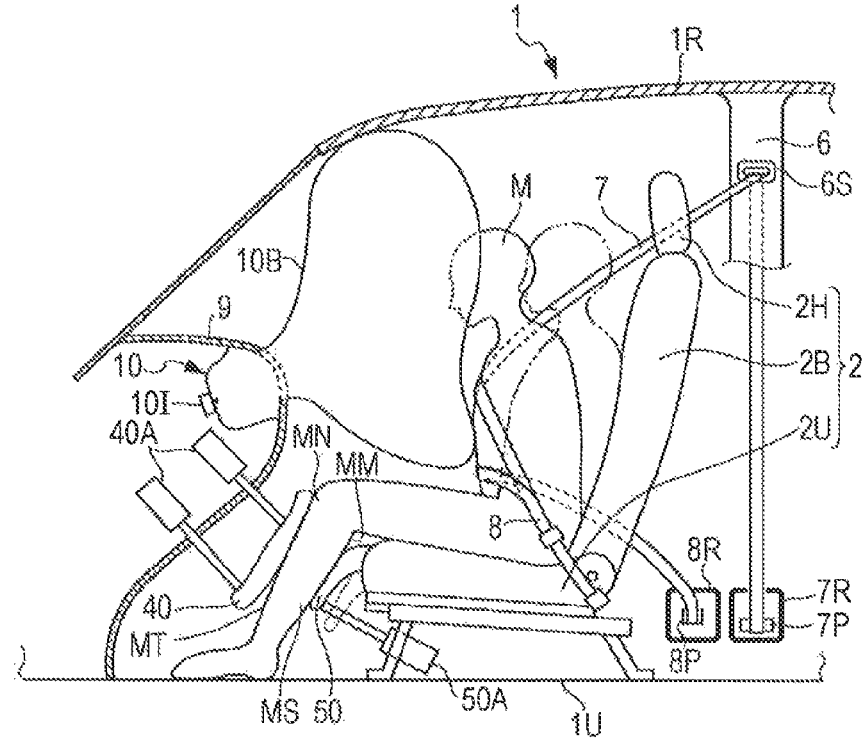
FIG. 13 is a vehicle space side view of a vehicle including an occupant protection device according to a ninth implementation of the present invention.

FIG. 13 is a vehicle space side view of the vehicle 1 including an occupant protection device according to a ninth implementation of the present invention. The same reference numerals are employed regarding the same configurations as those in FIG. 2, and description thereof will be omitted accordingly. FIG. 13 illustrates a state in which the kneecap regulation unit and calf regulation unit are activated by a collision. Specifically, FIG. 13 illustrates a state in which there are activated the upper bey body airbag 10B of the upper body airbag unit 10 configured to protect the upper body, a knee guard 40 corresponding to the kneecap regulation unit, and a calf regulation member 50 corresponding to the calf regulation unit.

The occupant protection device according to the ninth implementation of the present invention is made up of the knee guard 40 serving as the kneecap regulation unit, the calf regulation member 50 serving as the calf regulation unit, and the waist seatbelt 8. The knee guard 40 is provided to the lower portion of the dash panel 9 extending in the vehicle width direction in front of the occupant M. The calf regulation member 50 is provided so as to be moved separately from the seat 2, which is positioned on the forward side of the seat cushion 2U of the seat 2.

A knee guard actuator 40A configured to drive the knee guard 40 toward the knees of the occupant M is provided to the knee guard 40. A calf regulation member actuator 50A configured to drive the calf regulation member 50 toward the calves of the occupant. M is provided to the calf regulation member 50. Note that the calf regulation member 50 is provided so as to be moved separately from the seat 2 and so as to be used as a footrest where the calves MS of the occupant. N are put at the time of normal use.

The occupant protection device according to the ninth implementation of the present invention is configured so that the knee guard 40 suppresses forward movement of the kneecaps MN of the occupant N at the time of operation. The knee guard actuator 40A drives the knee guard 40 in response to the signal at the time of a collision to move toward the shins MT of the occupant M. The calf regulation member actuator 50A drives the calf regulation member 50 in response to the signal at the time of a collision to move so as to Press the calves MS of the occupant M.

At the time of a collision, the upper body inflator 10I, shoulder retractor 7R, and waist retractor 8R are activated. After activation, the knee guard actuator 40A drives the knee guard 40, the calf regulation member actuator 50A drives the calf regulation member 50, the upper body airbag unit 10 expands the upper body airbag 10B, and the shoulder retractor 7R and waist retractor 8R cause the shoulder seatbelt 7 and waist seatbelt 8 to forcibly restrain the occupant M. Thus, the knee guard 40 suppresses forward movement of the kneecaps MN of the occupant M. Also, the calf regulation member 50 presses the calves MS of the occupant M. Further, the waist seatbelt 8 suppresses forward movement of the waist MW of the occupant M. Therefore, it in the overall occupant protection device, the movement of the lower legs of the occupant M is suppressed, thereby enabling the restraining position of the occupant N to be made suitable. According to mechanical driving such as the knee guard 40 and calf regulation member 50, restraining of the occupant M can be performed in a more stable manner. Also, since the knee guard 40 and calf regulation member 50 are structures with strength, the lower legs of the occupant H can be maintained with little displacement after restraining, and can be restrained in a stable manner.

Tenth Implementation

Figure 14:
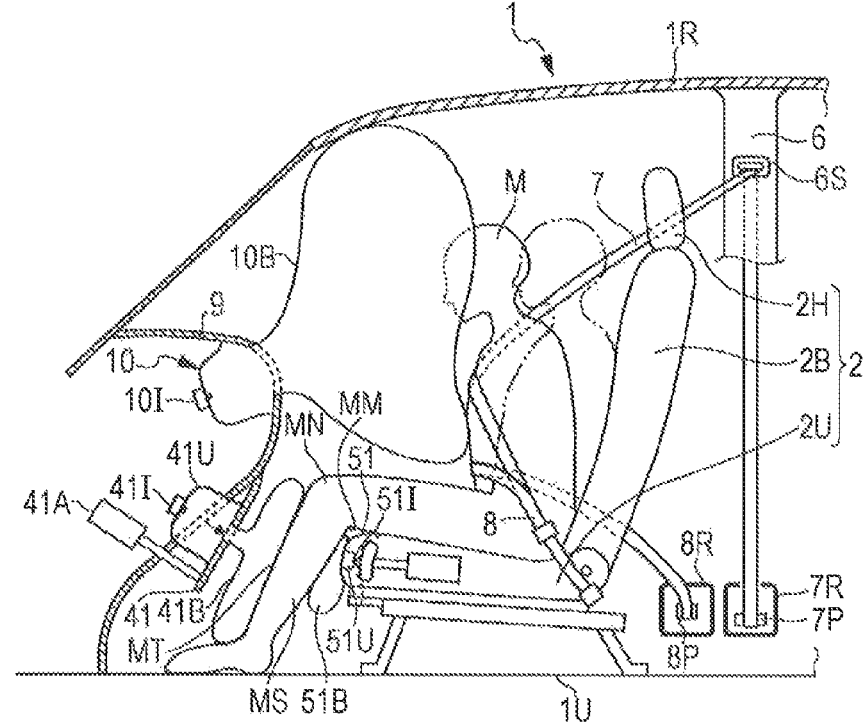
FIG. 14 is a vehicle space side view of a vehicle including an occupant protection device according to a tenth implementation of the present invention.

FIG. 14 is a vehicle space side view of the vehicle 1 including an occupant protection device according to a tenth implementation of the present invention. The same reference numerals are employed regarding the same configurations as those in FIG. 2, and description thereof will be omitted accordingly. FIG. 14 illustrates a state in which the kneecap regulation unit and calf regulation unit are activated by a collision. Specifically, FIG. 14 illustrates a state in which there are activated the upper body airbag 10B of the upper body airbag unit 10 configured to protect the upper body, a knee guard 41 and a knee guard knee airbag 41B corresponding to the kneecap regulation unit, and a calf regulation member 51 and a calf regulation airbag 51B corresponding to the calf regulation unit.

The occupant protection device according to the tenth implementation of the present invention is made up of the knee guard 41 and knee airbag 41B serving as the kneecap regulation unit, the calf regulation member 51 and calf regulation airbag 51B serving as the calf regulation unit, and the waist seatbelt 8. The knee guard 41 and knee guard airbag 41E are provided to the lower portion of the dash panel 9 extending in the vehicle width direction in front of the occupant M. The calf regulation member 51 is provided so as to be moved integral with the seat 2, which is positioned on the forward side of the seat cushion 2U of the seat 2. Note that the calf regulation member 51 is normally a portion of the seat cushion 2U of the seat 2, and is configured integral with the seat cushion 2U. The lower end of the knee guard knee airbag 41B which is a knee airbag is equal to or lower than that of the calf regulation airbag 51B in the vertical direction of the vehicle 1. Thus, the lower legs of the occupant can be regulated in a stable manner.

A knee guard actuator 41A configured to drive the knee guard 41 toward the knees of the occupant M is provided to the knee guard 41. Further, a knee guard knee airbag unit 41U is attached to the knee guard actuator 41A. The knee guard actuator 41A drives the knee guard 41 in response to the signal at the time of a collision to approach the knees of the occupant M. Further, the knee guard knee airbag unit 41U activates a knee guard knee airbag inflator 41I in response to the signal at the time of a collision to expand the knee guard knee airbag 41B. The knee guard knee airbag 41B is expanded from the protruding knee guard 41.

A calf regulation actuator 51A configured to drive the calf regulation member 51 toward the calves of the occupant M is provided to the calf regulation member 51. Further, a calf regulation airbag unit 51U is attached to the calf regulation actuator 51A. The calf regulation actuator 51A drives the calf regulation member 51 in response to the signal at the time of a collision to approach the calves of the occupant M. Further, the calf regulation airbag unit 51U activates a calf regulation inflator 51I in response to the signal at the time of a collision to expand the calf regulation airbag 51B. The calf regulation airbag 51B is expanded from the calf regulation member 51 having a protruding footrest configuration.

The occupant protection device according to the tenth implementation of the present invention is configured so that the knee guard 41 and knee guard knee airbag 41B suppress forward movement of the kneecaps MN of the occupant M at the time of operation. The knee guard actuator 41A drives the knee guard 41 in response to the signal at the time of a collision to move so as to press the shins MT of the occupant M. Further, the knee guard knee airbag 41B is also expanded and inflated in response to the signal at the time of a collision. The calf regulation actuator 51A drives the calf regulation member 51 in response to the signal at the time of a collision to move so as to press the calves MS of the occupant M. Further, the calf regulation airbag 51B is also expanded and inflated in response to the signal at the time of a collision.

At the time of a collision, the upper body inflator 10I, shoulder retractor 7R, and waist retractor 8R are activated. After activation, the knee guard actuator 41A drives the knee guard 41 to expand the knee guard knee airbag 41B, the calf regulation actuator 51A drives the calf regulation member 51 to expand the calf regulation airbag 51B, the upper body airbag unit 10 expands the upper body airbag 10B, and the shoulder retractor 7R and waist retractor 8R cause the shoulder seatbelt 7 and waist seatbelt 8 to forcibly restrain the occupant M. Thus, the knee guard 41 and knee guard knee airbag 41B suppress forward movement of the kneecaps MN of the occupant M. Also, the calf regulation member 51 and calf regulation airbag 51B press the calves MS of the occupant M. Further, the waist seatbelt 8 suppresses forward movement of the waist MW of the occupant M. Therefore, in the overall occupant protection device, the movement of the lower legs of the occupant M is suppressed, thereby enabling the restraining position of the occupant M to be made suitable. Mechanical driving and an airbag are combined such as a combination between the knee guard 41 and knee guard knee airbag 41B, and a combination between the calf regulation member 51 and calf regulation airbag 51B, thereby enabling restraining of the occupant M in a more stable manner. Also, since the knee guard 41 and calf regulation member 51 are structures with strength, the lower legs of the occupant M can be maintained with little displacement after restraining, and can be restrained in a stable manner. Further, the knee guard knee airbag 41B and calf regulation airbag 51B are employed together, thereby enabling followability and security for the lower legs of the occupant M. In the present invention, at the time of a collision includes the time of pre-crash before the collision.

Configurations and Advantages of Implementations

The occupant protection devices according to the present implementations protect an occupant who sits in a seat, which includes a kneecap regulation unit configured to suppress forward movement of the kneecaps of the occupant at the time of a collision of a vehicle (first, second, third, fourth, fifth, sixth, seventh, eighth, ninth, and tenth implementations).

The above configuration enables the restraining position of the occupant to be made suitable, suppressing movement of the kneecaps.

The occupant protection device according to the present invention may include a seatbelt configured to suppress forward movement of the lower torso of the occupant (first, second, third, fourth, fifth, sixth, seventh, eighth, ninth, and tenth implementations).

The above configuration enables the restraining position of the occupant to be made suitable, suppressing movement of the lower torso.

The occupant protection device according to the present invention may include a behind-the-knee regulation unit configured to press behind the knees of the occupant (first, second, third, fourth, fifth, and seventh implementations).

The above configuration enables the lower legs of the occupant to be restrained in a stable manner and enables the restraining position of the occupant to be made suitable.

The occupant protection device according to the present invention may include a calf regulation unit configured to press calves of the occupant (first, second, third, fourth, fifth, seventh, ninth, and tenth implementations).

The above configuration enables the lower legs of the occupant to be restrained in a stable manner and enables the restraining position of the occupant to be made suitable.

The kneecap regulation unit of the occupant protection device according to the present invention may be a knee airbag (first, second, third, fourth, fifth, sixth, seventh, eighth, and tenth implementations).

The above configuration enables the lower legs of the occupant to be restrained in a stable manner.

The kneecap regulation unit of the occupant protection device according to the present invention may be a knee guard (ninth and tenth implementations).

The above configuration enables the lower legs of the occupant to be restrained in a stable manner reducing displacement after restraining the lower legs of the occupant.

The kneecap regulation unit of the occupant protection device according to the present invention may include a first knee airbag in front of the occupant, a second knee airbag provided to door trim of the vehicle, and a third knee airbag provided to the center console of the vehicle (sixth implementation).

The above configuration enables the airbags to be expanded rapidly, reducing the bag capacity per airbag, and enables the occupant to be restrained, more rapidly.

The calf regulation unit of the occupant protection device according to the present invention may be a calf airbag configured to press the calves (first, second, third, fourth, fifth, seventh, and tenth implementations).

The above configuration enables calves of the occupant to be protected in a stable manner.

The calf regulation unit of the occupant protection device according to the present invention may be a calf regulation member provided to the front side of the seat so as to be moved separately from the seat (ninth implementation).

The above configuration enables calves of the occupant to be protected in a stable manner.

The calf regulation unit of the occupant protection device according to the present invention may be a calf regulation member provided to the front side of the seat so as to be moved integral with the seat (tenth implementation).

The above configuration enables calves of the occupant to be protected in a stable manner utilizing a portion provided integral with the seat.

The knee airbag of the occupant protection device according to the present invention may press from the kneecaps to the shins (second, third, fourth, fifth, seventh, and tenth implementations).

The above configuration enables the kneecaps of the occupant to shins to be protected by the knee airbag.

The knee airbag of the occupant protection device according to the present invention may press from the kneecaps to both sides of the kneecaps, shins, to both sides of the shins (third, fifth, and seventh implementations).

The above configuration enables the kneecaps of the occupant to both sides of the kneecaps, shins, to both sides of the shins to be protected by the knee airbag.

The knee airbag of the occupant protection device according to the present invention may be divided to at least two in the vertical direction of the vehicle, which press from the kneecaps to the shins (seventh implementation).

The above configuration enables the kneecaps of the occupant to shins to be protected, enables the knee airbag to be expanded rapidly, reducing the bag capacity per airbag, and enables movement of the occupant to be restrained more rapidly.

The knee airbag of the occupant protection device according to the present invention may be divided to at least two in the horizontal direction of the vehicle, which press from the kneecaps and both sides of the kneecaps (eighth implementation).

The above configuration enables the kneecaps of the occupant to both sides of the kneecaps to be protected, enables the knee airbag to be expanded rapidly, reducing the bag capacity per airbag, and enables movement of the occupant to be restrained more rapidly.

The calf airbag of the occupant protection device according to the present invention may be provided to the seat (second, third, fourth, fifth, and tenth implementations).

The above configuration enables space to be effectively used.

The calf airbag of the occupant protection device according to the present invention may be provided to the cross member (first implementation).

The above configuration enables space to be effectively used.

The calf airbag of the occupant protection device according to the present invention may press from the calves to both sides of the calves (fourth, fifth, and seventh implementations).

The above configuration enables the calves of the occupant to both sides of the calves to be protected by the calf airbag.

The calf airbag of the occupant protection device according to the present invention may be divided to at least two in the vertical direction of the vehicle, which press from the calves to both sides of the calves (seventh implementation).

The above configuration enables the calves of the occupant to both sides of the calves to be protected, enables the calf airbag to be expanded rapidly, reducing the bag capacity per airbag, and enables movement of the occupant to be restrained more rapidly.

The calf regulation unit of the occupant protection device according to the present invention may be a calf airbag configured to press the calves, and the lower end of the knee airbag is equal to or lower than the lower end of the calf airbag in the vertical direction of the vehicle (tenth implementation).

The above configuration enables the lower legs of the occupant to be protected in a stable manner.

The invention claimed is:

1. An occupant protection device to protect an occupant who sits in a seat in a vehicle, comprising:
   a kneecap regulation unit that suppresses a forward movement of the kneecaps of the occupant at a time of a collision of the vehicle; and
   a behind-the-knee regulation unit comprising a rear lower leg airbag that expands to press an inner side of the knees of the occupant, wherein
   the behind-the-knee regulation unit is provided to a floor of the vehicle and configured to expand the rear lower leg airbag, principally, in an upward direction from the floor.

2. The occupant protection device according to claim 1, further comprising:
   a seatbelt that suppresses a forward movement of the lower torso of the occupant.

3. The occupant protection device according to claim 1, wherein
   the rear lower leg airbag expands to also press the calves of the occupant, and
   the behind-the-knee regulation unit is configured to expand the rear lower leg airbag to a position between the seat and both the inner side of the knees and the calves of the occupant.

4. The occupant protection device according to claim 1, further comprising:
   a calf regulation unit that presses the calves of the occupant.

5. The occupant protection device according to claim 4, wherein the calf regulation unit is a calf airbag that presses the calves.

6. The occupant protection device according to claim 5, wherein the calf airbag is provided to a cross member.

7. The occupant protection device according to claim 5, wherein the calf airbag presses from the calves to both sides of the calves.

8. The occupant protection device according to claim 5, wherein the calf airbag is divided into at least two in the vertical direction of the vehicle, and presses from the calves to both sides of the calves.

9. The occupant protection device according to claim 5, wherein
   the calf regulation unit is a calf airbag that presses the calves; and
   the lower end of the knee airbag is equal to or lower than that of the calf airbag in the vertical direction of the vehicle.

10. The occupant protection device according to claim 1, wherein the kneecap regulation unit is a knee airbag.

11. The occupant protection device according to claim 10, wherein the knee airbag presses from the kneecaps to the shins.

12. The occupant protection device according to claim 10, wherein the knee airbag presses from the kneecaps, both sides of the kneecaps and shins, to both sides of the shins.

13. The occupant protection device according to claim 10, wherein the knee airbag is divided into at least two in the vertical direction of the vehicle, and presses from the kneecaps to the shins.

14. The occupant protection device according to claim 10, wherein the knee airbag is divided into at least two in the horizontal direction of the vehicle, and presses the kneecaps and both sides of the kneecaps.

15. The occupant protection device according to claim 1, wherein the kneecap regulation unit is a knee guard.

16. The occupant protection device according to claim 1, wherein the kneecap regulation unit includes
   a first knee airbag provided to the front of the occupant,
   a second knee airbag provided to a door trim of the vehicle, and
   a third knee airbag provided to the center console of the vehicle.

17. The occupant protection device according to claim 1, wherein
   the kneecap regulation unit and the behind-the-knee regulation unit cooperate, at the time of a collision of the vehicle, to suppress a vertical movement of the knees of the occupant.

* * * * *